United States Patent [19]

Fertner et al.

[11] Patent Number: 5,987,005
[45] Date of Patent: Nov. 16, 1999

[54] METHOD AND APPARATUS FOR EFFICIENT COMPUTATION OF DISCRETE FOURIER TRANSFORM (DFT) AND INVERSE DISCRETE FOURIER TRANSFORM

[75] Inventors: Antoni Fertner, Solna; Anders Örling; Mattias Hyll, both of Stockholm, all of Sweden

[73] Assignee: Telefonaktiebolaget LM Ericsson, Stockholm, Sweden

[21] Appl. No.: 08/887,467

[22] Filed: Jul. 2, 1997

[51] Int. Cl.[6] ............................................. G03H 1/12
[52] U.S. Cl. ..................... 370/210; 370/203; 370/208; 342/76.21; 382/280
[58] Field of Search ................................. 370/210, 208; 708/405; 375/260; 342/76.21; 382/280

[56] References Cited

U.S. PATENT DOCUMENTS

| 3,803,391 | 4/1974 | Vernet | 708/405 |
| 4,051,357 | 9/1977 | Bonnerot | 708/405 |
| 4,164,021 | 8/1979 | Nishitani et al. | 708/405 |
| 4,435,774 | 3/1984 | Classan et al. | 708/405 |
| 5,673,290 | 9/1997 | Cioffi | 375/260 |

FOREIGN PATENT DOCUMENTS

| 08163074 | 6/1996 | Japan . |
| 95/28773 | 10/1995 | WIPO . |

OTHER PUBLICATIONS

*IEEE Transactions on Signal Processing*, vol. 43, No. 9, Sep. 1995, p. 2193/2194, K.M. Lam et al., "Computing the Inverse DFT with the In–Place, In–Order Prime Factor FFT Algorithm".

*IEEE Transactions on Signal Processing*, vol. 41, No. 3, Mar. 1993, pp. 1184–1200, Sorensen et al., "Efficient Computation of the DFT with Only a Subset of Input or Output Points".

*IEEE* 1992, pp. V–13–V16, Chao Lu, "New Algorithms for the FFT Computation of Symmetric and Translational Complex Conjugate Sequences".

"Digital Communications," J. Proakis, pp. 680, 686–693, Chapter 12, "Multichannel and Multicarrier Systems," McGraw–Hill Series in Electical and Computer Engineering, McGraw–Hill, Inc, 1995, ISBN 0–07–051726–6.

"Digital Signal Processing Algorithms and Applications," J.D. Proakis and D.G. Manolakis, 2nd Ed., Macmillan, 1992, pp. 733–734.

Sharp Application Notes, Digial Signal Processing, LH9124, pp. 1A–3–1A–21, 1993.

Communications of the ACM, vol. 11, No. 10, Oct. 1968, pp. 703–710, J.F. Traub, "Numerical Analysis".

*IEEE Transactions On Acoustics, Speech, and Signal Processing*, vol. ASSP–30, No. 4, Aug. 1982, pp. 595–607, Robert D. Preuss, "Very Fast Computation of the Radix–2 Discrete Fourier Transform".

(List continued on next page.)

*Primary Examiner*—Hassan Kizou
*Assistant Examiner*—John Pezzlo
*Attorney, Agent, or Firm*—Nixon & Vanderhye P.C.

[57] ABSTRACT

The present invention significantly reduces the number of complex computations that must be performed in computing the discrete Fourier transform (DFT) and inverse DFT (IDFT) operations. In particular, the DFT and IDFT operations are computed using the same computing device. The computation operations are substantially identical for both operations with the exception that for the IDFT operation, the data are complex conjugated before and after processing. Using the same computing device/operations, both DFT and IDFT computations are optimized for maximum efficiency. A common transform process is selectively connected to first and second data processing paths. A DFT operation is performed on an N-point sequence on the first data processing path, and an IDFT operation is performed on an N-point sequence on the second data processing path using the same N-point fast Fourier transform (FFT).

39 Claims, 6 Drawing Sheets

OTHER PUBLICATIONS

G.V. Zaitsev and N.E. Nagulin, "Class of Fast Fourier Transform Algorithms for a Real Sequence," 1983 Plenum Publishing Corporation, pp. 40–49.

*IEEE Journal Of Solid-State Circuits*, vol. 30, No. 3, Mar. 1995, pp. 300–305, E. Bidet et al., "A Fast Single–Chip Implementation of 8192 Complex Point FFT".

Motorola, Inc., Digital Signal Processor Division, Austin Texas, Wei Chen & Scott King, "Implementation of Real–Valued Input FFT on Motorola DSPs," pp. 806–811.

*IEEE Transactions on Acoustics, Speech, and Signal Processing*, vol. ASSP–35, No. 6, Jun. 1987, pp. 849–863, Henrik V. Sorensen et al., "Real–Valued Fast Fourier Transform Algorithms".

METHOD AND APPARATUS FOR EFFICIENT COMPUTATION OF DISCRETE FOURIER TRANSFORM (DFT) AND INVERSE DISCRETE FOURIER TRANSFORM

FIELD OF THE INVENTION

The present invention relates to the discrete Fourier transform (DFT) and the inverse discrete Fourier transform (IDFT) which are both used in a wide variety of signal processing applications. In particular, the present invention presents a method and apparatus to efficiently compute the DFT and IDFT.

BACKGROUND AND SUMMARY OF THE INVENTION

Orthogonal transforms and transform properties are extraordinarily useful in solving new technological problems. Such transforms permit analysis of a signal given some knowledge of its constituent parts. For example, the Fourier transform has long been a powerful and principle analysis tool in diverse fields, such as linear systems, probabililty theory, boundary-valued problems, communications theory, signal processing, etc. The discrete Fourier transform (DFT) is the counterpart of the Fourier transform in the screte time domain. In general, the DFT may be defined as follows:

$$X(k) = \sum_{n=0}^{N-1} x(n) W_N^{kn} \quad k = 0, 1, \ldots, N-1 \quad (1)$$

and the inverse DFT (IDFT) is expressed as:

$$x(n) = 1/N \sum_{k=0}^{N-1} X(k) W_N^{-kn} \quad n = 0, 1, \ldots, N-1 \quad (2)$$

where $W_N^k = e^{-j2\pi k/N}$. In equations (1) and (2), x(n) is the sample value in the time domain, and X(k) is the sample value in the frequency domain.

Direct computation of the DFT and the IDFT requires $N^2$ complex multiplications and $N(N-1)$ complex additions. Such data processing overhead is quite onerous. One helpful and important tool in modem digital signal processing applications is therefore the fast Fourier transform (FFT). The FFT is an efficient algorithm for computing the DFT by mapping an N-point complex sequence to its corresponding N-point complex frequency spectrum.

Although most FFT algorithms are designed to compute the DFT of a complex sequence, in many applications, the sequence to be transformed is real valued. Nevertheless, even in these real valued applications, the FFT algorithm performs multiple complex multiplications and additions. Even with the increased efficiency and speed provided using the FFT algorithm, there is an ongoing need to reduce the number of computations, and in particular, the number of complex multiplications that must be performed in order to more efficiently compute the DFT and the IDFT.

The present invention achieves a significant reduction in the number of complex computations that must be performed in computing the DFT and IDFT. In particular, the DFT and IDFT operations are computed using the same computing device with the computation operations being substantially identical for both operations with the exception that for the IDFT operation, the data are complex conjugated before and after processing. Using the same computing device/operations, both DFT and IDFT computations are optimized for maximum efficiency. Indeed, efficiency improvement is on the order of 50 percent compared with more traditional, brute force FFT/IFFT computations.

A data processing device employing the present invention includes first and second data processing paths. A transform process (in particular a DFT processor) is selectively connected to the first and second data processing paths, and selectively performs a DFT operation on an N-point complex sequence in the time domain present on the first data processing path and an IDFT on an N-point complex sequence in the frequency domain present on the second data processing path using the same N-point fast Fourier transform. For purposes of this invention, N is a positive integer, and the term point is the number of symbols in a sequence. Each such sequence symbol is considered a complex number whether or not the symbol includes both real and imaginary parts. In the frequency domain, a symbol may be viewed as a spectral component.

The first data processing path corresponds to the DFT operation, and the second data processing path corresponds to the IDFT operation. In a particularly advantageous application of the invention, a 2N-point, real sequence in the time domain is translated into the frequency domain via the first data processing path. The 2N-point real sequence is compressed into an N-point complex sequence before routing to the transform processor. The N-point complex data are transformed using an N-point DFT operation executed by the transform processor, and the transform processor output is then translated into an N-point spectral sequence in the frequency domain.

Along the second data processing path, an N-point, complex spectral sequence, instead of being extended to a 2N-point Hermite symmetric sequence as required to obtain a real sequence in the time domain, is processed to generate an N-point spectral input sequence, which when processed by the transform processor, results in an N-point sequence in the time domain. The N-point output sequence is complex conjugated, and then converted from an N-point complex sequence into a 2N-point real sequence.

In one advantageous application of the present invention to data communications, the first data processing path corresponds to a portion of a receiver, and the second data processing path corresponds to a portion of a transmitter. The receiver and transmitter may function for example as a modem. One preferred modem type is a discrete, multi-tone (DMT) modern. The transmit data processing path modulates a symbol sequence onto multiple carriers, and the receive data processing demodulates the multiple carriers and reconstructs the transmitted symbol sequence.

Because both transmitter and receiver data processing paths use the same DFT processor to perform frequency-to-time and time-to-frequency transformations, e.g., DMT modulation and demodulation, a more economic transceiver may be achieved in terms of efficiency, size, expense, complexity, and power dissipation. In the DMT modem example, the same, N-point Fourier transform performs IDFT modulation of a symbol sequence having in effect twice that number of points in the sequence as well as DFT demodulation of received signals also having 2N-points. It is in this fashion that the present invention is able to reduce the computational complexity of the transformation operations by approximately 50 percent, i.e., from $2N\log_2 2N$ complex multiplications to $N\log_2 2N$ complex multiplications.

Thus while the primary object of the present invention is to provide a particulary efficient method and apparatus for DFT/IDFT computations, these and other objects and advances of the present invention will become apparent to those skilled in the art as described below in further detail, and in conjunction with the figures and the appended claims.

DETAILED DESCRIPTION OF THE DRAWINGS

DETAILED DESCRIPTION OF THE INVENTION

In the following description, for purposes of explanation and not limitation, specific details are set forth, such as particular embodiments, circuits, hardware configurations, techniques, flow of steps, etc., in order to provide a thorough understanding of the present invention. However, as will be apparent to one skilled in the art, the present invention may be practiced in other embodiments apart from these specific details. In other instances, detailed descriptions of well known methods, algorithms, devices, and circuits are omitted so as not to obscure the description of the present invention with unnecessary detail.

Figure 1:
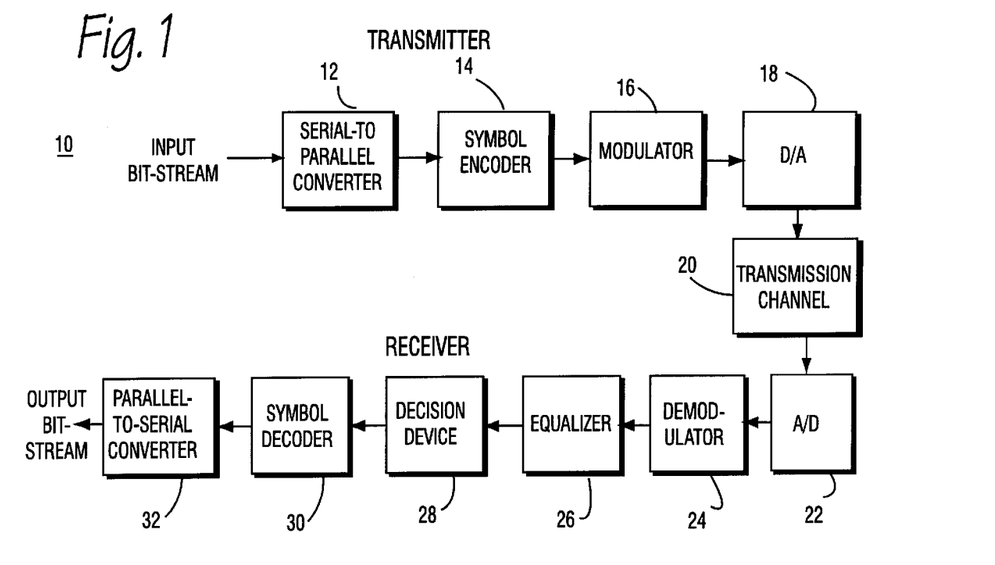
FIG. 1 is a function block diagram of a communications system, which is one example where the present invention may be advantageously employed.

One advantageous but nevertheless example embodiment of the present invention is to data transmission and reception, and in particular, to modulators/demodulators or simply modems. FIG. 1 illustrates a function block diagram format an example data communications system 10. A transmitter includes among other things serial-to-parallel converter 12, symbol encoder 14, modulator 16, and digital-to-analog converter 18. Data is transmitted from the transmitter over a transmission channel 20 and is received in a receiver including an analog-to-digital converter 22, demodulator 24, equalizer 26, decision device 28, symbol decoder 30, and parallel-to-serial converter 32.

In operation, an input signal such as a digital bit stream is converted in serial to parallel converter 12 into a parallel format of "N" groups, where N is a positive integer. As will be described in further detail in an example embodiment below, N may correspond to the number of sub-channels in a discrete multi-tone (DMT) modem. The symbol encoder 14 maps the bit pattern of each N-point group into a two dimensional signal constellation in the complex domain. As stated above, each point in the signal constellation is represented by a complex vector, and therefore, the output from the symbol encoder 14 is a sequence of N symbols corresponding to complex umbers/vectors, e.g., one for each sub-channel in a discrete multi-tone modem. The modulator 16 modulates complex symbols onto 2N carriers or "tones".

The modulator 16 performs an inverse discrete Fourier transform on 2N-complex numbers or points and generates a real valued sequence that may be considered the superposition of 2N-modulated, orthogonal carriers with frequencies spaced $f_S/(2N)$ part where $f_S$ is the sampling frequency. The modulated carriers are then digital-to-analog converted and transmitted over transmission channel 20 to a receiver.

The receiver, in theory, logically reverses the transmitter operations. First, the received signal is converted to digital format in an analog-to-digital converter 22, and demodulated in a demodulator 24. In the preferred example embodiment of the present invention applied to a discrete multi-tone modem, demodulator 24 performs a discrete Fourier transform (DFT) generating a complex number for each subcarrier. Each subcarrier is then equalized by a complex equalizer 26, e.g., a one-tap complex equalizer, to compensate for phase and amplitude distortion introduced by transmission channel 20. The decision device 28 quantizes the complex samples from equalizer 26 to the closest signal point in the complex constellation used by symbol encoder 14. These signal points are then decoded in symbol decoder 30, i.e., each symbol is translated into a corresponding bit pattern, and converted into a serial output bitstream by parallel-to-serial converter 32.

The DFT operation performed in the demodulator 24 may be computed by means of a 2N-point fast Fourier transform (FFT) operation. Similarly, the inverse discrete Fourier transform of a 2N-point sequence performed in the modulator 16 may be performed using a 2N-point inverse FFT (IFFT) calculation. However, computing a 2N-point FFT/IFFT requires considerable data processing resources. In general, the fast Fourier transform of an N-point sequence, where N is a power of 2 ($N=2^m$), requires N $\log_2$ (N) complex multiplications. If 2N-point sequences are transformed, the numerical computation "cost" is 2N $\log_2$ (2N). Using the approach of the present invention both the DFT and IDFT of 2N-point symbol sequences are calculated using an N-point FFT to reduce this numerical cost considerably.

The inventors observed that it is possible to do an IDFT operation as efficiently as a DFT operation and that with some minimal data manipulation/data processing overhead, both the DFT and IDFT may be performed using the same operations and the same transform processor. As a result, a single computing device and/or algorithm may be optimized to efficiently perform both the DFT and the IDFT.

The general property of complex numbers permits the IDFT to be expressed in terms of the DFT as follows:

$$IDFT(X) = \frac{1}{N}[DFT(X^*)]^* \quad (3)$$

where X is an input sequence, 1/N is a scaling factor, and * depicts the complex conjugate operation. The scaling factor 1/N may be readily implemented in successive circuits, e.g., in a frequency domain equalizer. The invention exploits this property in order to use the same computational circuitry for both the modulator and demodulator in the transmission and reception of data.

In implementing the DFT, the fast Fourier transform algorithm performs complex multiplication and additions even though in many applications the input data include only real values. Therefore, in those instances where the input data includes only real values, the fast Fourier transform simply substitutes a zero for the imaginary transform terms. Accordingly, a 2N-point FFT of a 2N-point, real N sequence will yield a 2N-point complex sequence exhibiting Hermite symmetry.

The transform efficiency is improved considerably in the present invention by computing the DFT of a real-valued sequence that is twice as long as the DFT input with one half of the real-valued sequence treated as the real part and the other half of the real-valued sequence treated as the imaginary part. If $x_1(n)$ and $x_2(n)$ are two real-valued sequences of length N, a complex-valued sequence $x_C(n)$ may be defined as follows:

$$x_C(n) = x_1(n) + j\, x_2(n) \quad (4)$$

Because the DFT operation is linear, the DFT of $x_C(n)$ may be expressed as follows:

$$X_C(k) = X_1(k) + jX_2(k) \quad (5)$$

One preferred way of implementing equation (4) employed in the present invention is to rearrange the data so that even samples form the real portion of the complex number $x_C(n)$, and the odd samples form the imaginary part of the created complex-valued sequence $x_C(n)$ as set forth below:

$$x_1(n) = x(2n) \quad n = 0, 1, \ldots, N-1 \quad (6)$$

$$x_2(n) = x(2n+1) \quad (7)$$

Thus, the 2N-point real sequence is subdivided into two N-point real sequences treated together as a single N-point "complex" sequence. Substituting equations (6) and (7) into equation (4) results in $$x_C(n) = x(2n) + j\, x(2n+1) \quad (8)$$

The sequences $X_1(k)$ and $X_2(k)$ are formed as follows:

$$X_1(k) = \frac{1}{2}[X_c(k) + X_c^*(N-k)] \quad (9)$$

$$X_2(k) = \frac{-j}{2}[X_c(k) - X_c^*(N-k)] \quad (10)$$

Thus, by performing a single DFT on the complex-valued sequence $x_C(n)$, the DFTs of the two real sequences $x_1(n)$ and $x_2(n)$ are obtained with only a small amount of additional computation involved from computing $X_1(k)$ and $X_2(k)$ using equations (9) and (10). The 2N-point DFT is therefore expressed in terms of two N-point DFTs, $X_1(k)$ and $X_2(k)$ using a decimation-in-time FFT algorithm:

$$X(k) = \sum_{n=0}^{N-1} x(2n) W_{2N}^{2nk} + \sum_{n=0}^{N-1} x(2n+1) W_{2N}^{(2n+1)k} \quad (11)$$

$$= \sum_{n=0}^{N-1} x_1(n) W_N^{nk} + W_{2N}^k \sum_{n=0}^{N-1} x_2(n) W_N^{nk} \quad (12)$$

Consequently, $$X(k) = X_1(k) + W_{2N}^k X_2(k),\ k = 0, 1, \ldots, N-1 \quad (13)$$

$$X(k+N) = X_1(k) - W_{2N}^k X_2(k),\ k = 0, 1, \ldots, N-1 \quad (14)$$

where $W_{2N}^k = e^{-j2\pi k/2N}$.

Thus, the DFT of a 2N-point real sequence may be computed using a single N-point DFT along with some additional computation as indicated by equations (13) and (14) above. If the DFT input sequence is Hermite symmetric (explained below) in the frequency domain, equation (14) is redundant, and therefore, the DFT need not be computed for indexes k+N. As a result, the vector X(k) contains N received symbols in the frequency domain which simplifies the number of transform operations that need to be performed in the DFT computation.

In order to use the same computational processor and operations to compute the IDFT as is used to compute the DFT, there must be some manipulation of the input data to ensure that the transformed output is real. As mentioned above, the DFT produces a complex output, and each of the output complex numbers contains both real and imaginary parts. If the sequence to be inverse transformed, e.g., the transmitted sequence in the DMT modem example, is Hermite symmetric, the transformed sequence will be real rather than complex.

Hermite symmetry is linked to a special property of the Fourier transform. If there are N points, those N points are Hermite symmetric if one-half of the N points are complex conjugates of the other half. For example, if N=8 and the third point is 1+j, than the fifth point must be 1−j. The first half of the points have corresponding complex conjugates in the second half of the points. In the DMT example, N carriers are used. However, to assure that the signal in the time domain is real, 2N carriers are modulated. The only function of N additional carriers is to cancel the imaginary parts of the complex symbols. The price paid to assure a purely real signal in the time domain is transmission of redundant information on extra N carriers.

Returning now to the task of performing an IDFT operation using the same processor/operations as used for the DFT operation, if an IDFT operation is performed on a Hermite symmetrical complex sequence, the result is a purely real signal in the time domain rather than a complex signal. Thus, in the example where IDFT operations are performed to implement DMT modulation in a transmitter, Hermite symmetry should be assured in order to transmit real-valued symbols in the time domain. That is, in order to assure a real IDFT output, the complex input sequence must be Hermite symmetric.

To attain that assurance, an N-point, complex, IDFT input sequence could be expanded to a 2N-point complex sequence that exhibits Hermite symmetry thereby resulting in a 2N-point, purely real, IDFT output. But that would require calculation of a 2N-point IDFT to effectively obtain a real, N-point sequence.

Using some relatively minor data manipulation on an N-point, complex IDFT input sequence, the present invention ensures Hermite symmetry and performs the IDFT using an N-point (rather than a 2N-point) FFT operation. In other words, after having established a Hermite symmetric input, the present invention is able to compute an N-point, real, IDFT output sequence directly from an N-point complex sequence using an N-point, complex sequence, DFT calculation. Accordingly, in the present invention, both a transmitter/modulator and receiver/demodulator may employ the same FFT hardware and FFT operations to implement both the IDFT and DFT operations. Moreover, there is no need to expand the N-point, IDFT input sequence into a 2N-point sequence in order to ensure Hermite symmetry.

Figure 2:
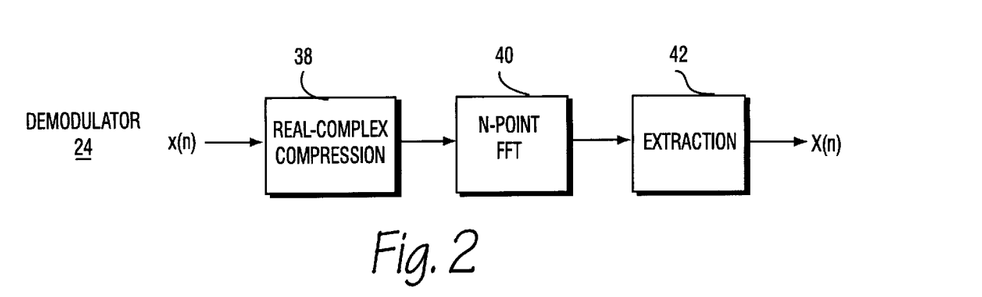
FIG. 2 is a function block diagram showing in further detail the demodulator shown in FIG. 1.
Figure 3:
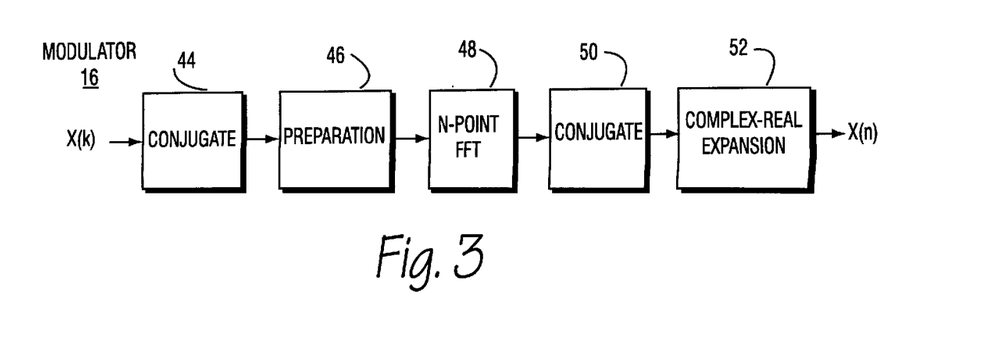
FIG. 3 is a function block diagram showing in further detail the modulator illustrated in FIG. 1.

As shown in FIGS. 2 and 3, the N-point FFT blocks 40 and 48 are the same. Therefore, the demodulator 24 and modulator 16 may selectively use the same FFT processor.

The demodulator 24 as shown in FIG. 2 receives a digitized, 2N-point,real sequence in the time domain, and the real-complex compression block 38 converts the 2N-point real sequence into an N-point complex sequence in the time domain. More specifically, the compressor 38 rearranges the 2N-point sequence so that the even real samples form the real part and the odd real samples form the imaginary part of a new, N-point, complex sequence $x_C(n)$ as set forth above. The N-point FFT block 40 implements the DFT converting the N-point, complex sequence in the time domain to an N-point sequence in the frequency domain. Some additional manipulation is performed in what is labeled the extraction block 42. The extraction block 42 implements equations (9) and (10), and in so doing, "extracts" an N-point complex sequence X(k) in the frequency domain as defined above in equation (13) is output for further processing by the equalizer block 26.

The modulator 16 is shown in FIG. 3. In particular, to implement the complex conjugate of the complex sequence X(k) as indicated in equation (3), the complex conjugate block 44 complex conjugates the N-point sequence X(k), the output of which is further manipulated by what is labeled the preparation block 46 to ensure efficient use of the complex FFT output in block 46. The preparation process manipulates the complex conjugated input to the N-point FFT block 48 to preserve Hermite symmetry for the reasons explained earlier. Advantageously, this manipulation assures Hermite symmetry without the need to expand the sequence to 2N points which would require a 2N-point FFT rather than an N-point FFT. Moreover, the extraction block 42 in the demodulator 24 and the preparation block 46 in the modulator 16 are identical. As a result, the same processing circuitry and/or software implemented operations may be used to perform the functions of blocks 40 and 48 and blocks 42 and 46. In this way, both the DFT and IDFT operations can be efficiently and economically performed.

The N-point sequence output from block 48 is then complex conjugated in block 50 to implement the second conjugate operation indicated in equation (3). The N-point, complex-conjugated sequence is then expanded in the complex-to-real expansion block from an N-point complex sequence into a 2N-point real sequence. More specifically, because the real and imaginary portions of each complex point correspond to real information, the N-point complex sequence is effectively expanded into a 2N-point real sequence, i.e., $x_1(n)+jx_2(n)$ is expanded into sequential real values $x_1(n)$, $x_2(n)$.

Figure 4:
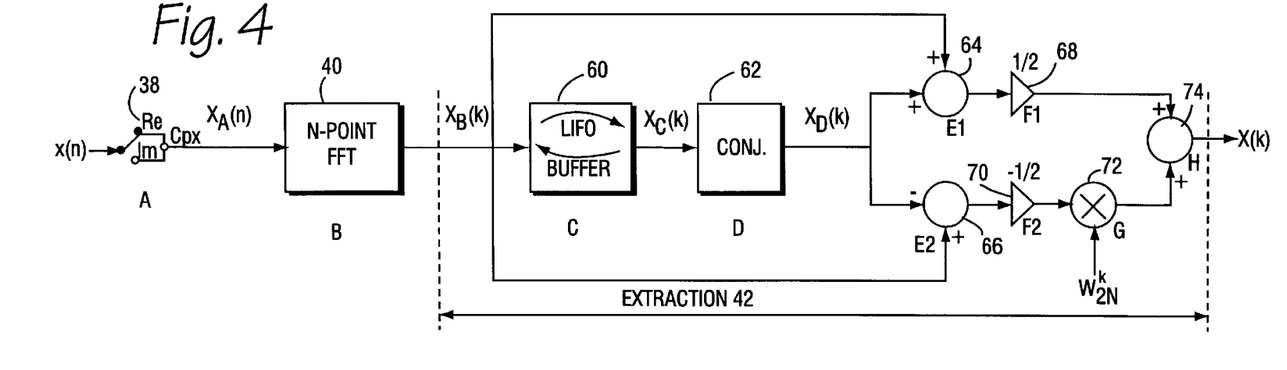
FIG. 4 is a more detailed figure of the demodulator shown in FIG. 2.

FIG. 4 shows in farther detail the demodulator 24 of FIG. 2, and in particular, the extraction block 42. The real-to-complex compressor 38 converts the real sequence x(n) to a complex sequence $x_A(n)$ by selecting each even sample as the real part and the next odd sample as the imaginary part using a simple switching and summing arrangement as shown. As a result, the data rate of the corresponding complex sequence $x_A(n)$ is half the data rate of the input sequence x(n). The input sequence x(n) is a 2N-point real valued sequence, and the corresponding "complex" sequence $x_A(n)$ is an N-point, complex valued sequence. The N-point, complex sequence is then transformed using the N-point FFT at block 40 to generate an N-point complex sequence $x_B(k)$.

In the extraction block shown in FIG. 4, a number of operations are performed on the N-point complex FFT output in order to generate the sequences $X_1(k)$ and $X_2(k)$ as defined in equations (9) and (10) ultimately outputting X(k) as defined in equation (11). First, the order of the N-point sequence $x_B(k)$ is reversed in sequence using a last-in-first-out (LIFO) buffer 60, i.e., $x_C(k)=x_B(N-k)$. Block 62 takes a complex conjugate of $x_C(k)$ by simply converting he sign of the imaginary part of each complex number in the N-point sequence resulting in an output $x_D(k)=x_B^*(N-k)$. The conjugated N-point complex sequence $x_D(k)$ is then combined in summer 64 with $x_B(k)$ and the sum is multiplied in multiplier 68 by a factor of ½. At differencer 66, the complex conjugated sequence $x_D(k)$ is subtracted from $x_B(k)$. The output differencer 66 is multiplied by constants $-j/2$ and $W_{2N}^k$ at multipliers 70 and 72, respectively. The constant $W_{2N}^k$ is a correction factor sometimes referred to as a "twiddle" factor in the FFT context. The outputs of multipliers 68 and 72, corresponding to sequences $X_1(k)$ and $X_2(k)$ as defined in equations (9) and (10) are then combined in summer 74 to generate the N-point complex sequence X(k) corresponding to the received real sequence x(n) as defined in equation (11).

Figure 5:
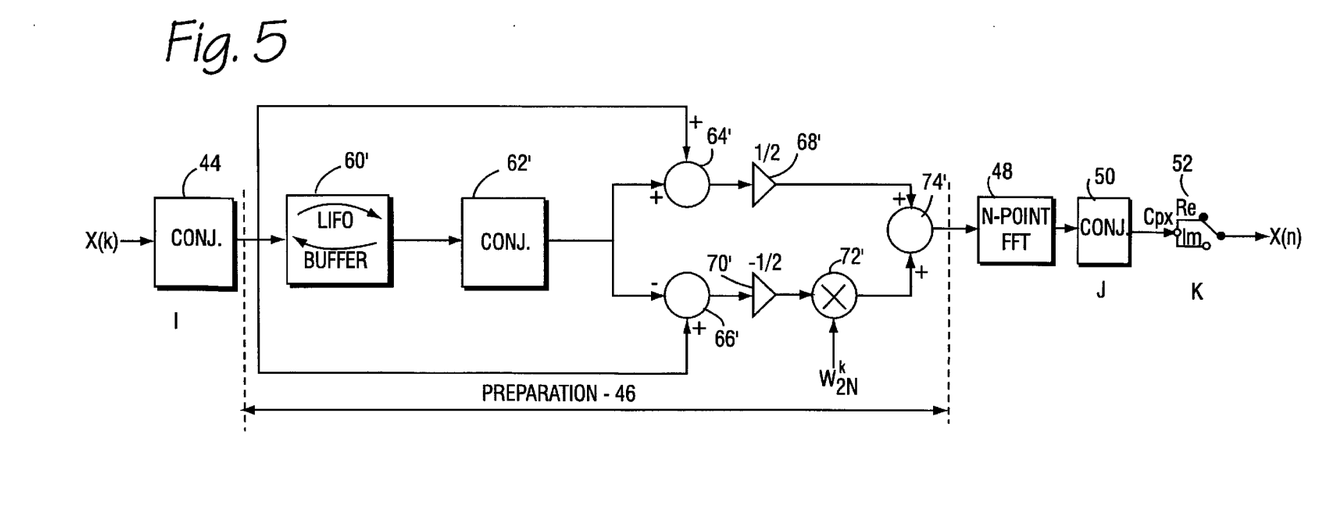
FIG. 5 is a more detailed drawing of the modulator shown in FIG. 3.

FIG. 5 illustrates in further detail the modulator 16 shown in FIG. 3. The complex symbol sequence to be transmitted X(k) is complex conjugated in block 44 and then processed in preparation block 46 which performs the same operations as the extraction block 42 shown in FIG. 4. Accordingly, the LIFO buffer 60', complex conjugator 62', summers 64' and 66'multipliers 68', 70' and 72' and combiner 74' performs the same operations as already described in conjunction with elements 60–74.

The preparation block 46 ensures that the N-point "complex" sequence is Hermite symmetric for reasons already explained above. One can view the preparation block 46 in the following way. The sequence processed in the upper and lower branches includes even real parts and odd imaginary parts. Because of the mathematical properties of the DFT, the transform output corresponding to the upper branch is purely real. In other words, the upper branch is Hermite symmetric with the real part being symmetric about the center of the sequence and the imaginary part being antisymmetric. In the lower branch, the reverse symmetries occur. Accordingly, the transform output corresponding to the lower branch is purely imaginary which may be viewed as Hermite symmetry for the imaginary part.

The output from preparation block 46 is then processed by the N-point FFT block 48 and complex conjugated in block 50. The complex to real expander 52 performs a complex-to-real conversion on the complex conjugated N-point output sequence using the selector and switch arrangement shown. The expander block 52 generates real numbers from the real and imaginary portion of each complex number at twice the rate at which each of the complex numbers is received.

Figure 6:
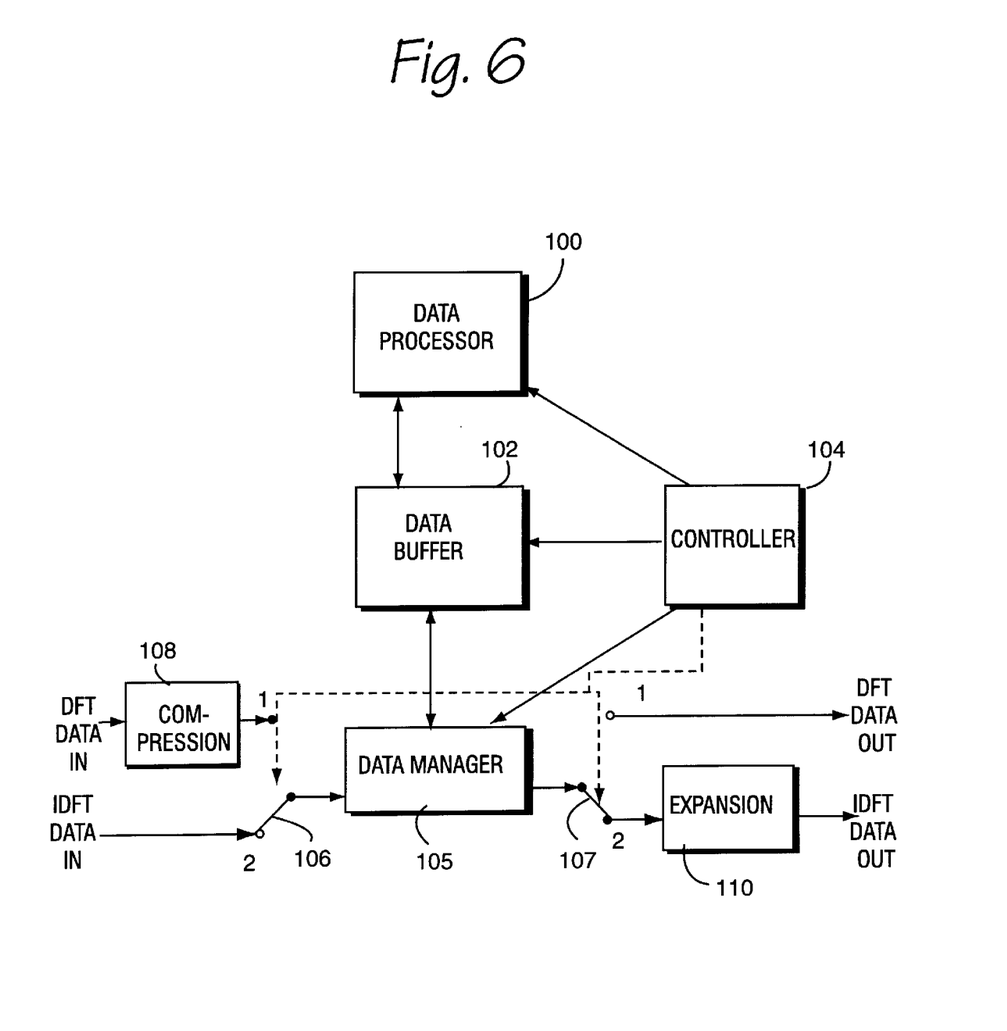
FIG. 6 is a function block diagram showing example hardware for implementing one example embodiment of the present invention.

One example embodiment for implementing the present invention in a general context is described in conjunction with the function block diagram show in FIG. 6. While various function blocks are shown here and in the above figures for performing data processing, buffering, controlling, managing, compression, an expansion functions, those skilled in the art will appreciate that one, several, or all of these functions maybe performed using one or more suitably programmed microprocessors, application specific integrated circuits (ASICs), digital signal processors, and/or discrete logic. In this regard, a "processor" or "transform circuitry" may include one or more of the above with the functions being driven by software or hardware design.

FIG. 6 shows two data processing paths, (1) corresponding to the DFT data processing path (or the receiver/demodulator for the modem example), and (2) corresponding the IDFT data processing path (or the transmitter/ modulator for the modem example). Each path is switchably connected to data manager 105 with the switches 106 and 107 being controlled by suitably timed control signals from the controller 104. The DFT data processing path includes a compression block 108 for performing the functions of block 38 to compress the real number sequence into a complex sequence. Similarly, the IDFT data processing path includes an expansion block 110 corresponding to the complex-to-real expansion block 52 shown in FIG. 3 for expanding the complex sequence into a real sequence as discussed above. As will be appreciated by those skilled in the art, the compression function 108 and expansion function 110 may be performed separately as shown or be incorporated as part of the tasks performed by the data manager 105, controller 104, or data processor 100.

The controller 104 selects the input source and output destination depending upon what operation, i.e., the DFT or the IDFT, is being performed on the input data. In this example, the data processor 100 is the main computation engine performing both the FFT operations and extraction/preparation operations depending upon whether a DFT or IDFT operation is to be performed. Information from the various data processing paths is routed between data processor 100 by the data manager 105 using one or more data buffers 102 under the control of controller 104.

Accordingly, if a DFT operation is to be performed, the controller 104 sets the switches 106, 107 into position 1 and controls the routing of the DFT data to and from the data processor 100 via data buffer 102. The data processor 100 performs the N-point FFT operation and the extraction operation and returns the processed information via data buffer 102 and data manager 105 to the DFT data output path as per the coordinating signaling from controller 104.

If an IDFT operation is to be performed, the controller 104 sets the switches 106 and 107 to position 2 and routes the information via data manager 105/data buffer 102 to data processor 100. The data processor then performs the complex conjugation, preparation, and N-point FFT, and complex conjugation operations described above in conjunction with FIGS. 3 and 5. The processed data is returned via the same path for output to the expansion block 110.

Figure 7:
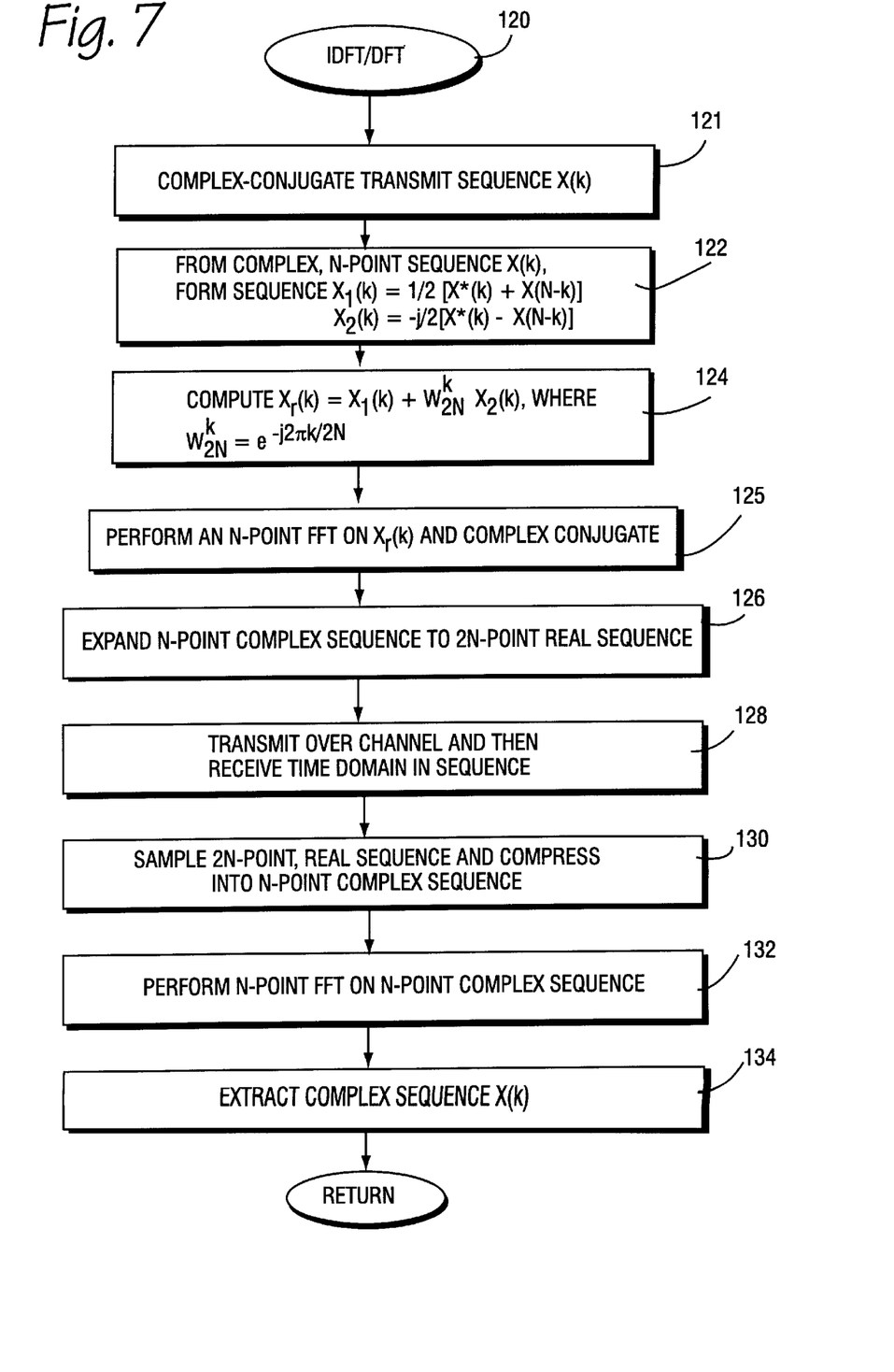
FIG. 7 is a flowchart diagram illustrating example procedures for implementing certain aspects of the present invention.

An example set of procedures for implementing the IDFT and DFT in accordance with one example embodiment of the present invention is outlined in conjunction with the flow chart IDFT/DFT routine 120 shown in FIG. 7. Starting with the path (1), a complex sequence X(k) is complex conjugated (block 121), and sequences $X_1(k)$ and $X_2(k)$ are formed from the N-point, complex-conjugated sequence X(k) (block 122). The resulting vector $X_r(k)$ summing sequence $X_1(k)$ with "twiddled" sequence $X_2(k)$ is calculated (block 124). An N-point FFT is performed on sequence $X_r(k)$ to implement the discrete Fourier transform operation and generate a corresponding time sequence (block 125). The FFT output is complex-conjugated (block 125), and the N-point complex sequence is expanded to a 2N-point, real sequence (block 126).

The information is transmitted over the communications channel and then received as a time domain sequence x(n) (block 128). The received sequence x(n) is sampled, and a 2N-point, real sequence is compressed into an N-point, complex sequence (block 130). An N-point FFT operation is performed on the N-point, complex sequence (block 132). The originally transmitted, complex sequence X(k) is extracted from the FFT output (block 134).

One advantageous, example application of the present invention is now disclosed in the context of a discrete multi-tone (DMT) modem. A discrete multi-tone transmitter is shown in FIG. 8, and a discrete multi-tone receiver 170 is shown in FIG. 9.

The fundamental goal of all "multi-carrier" modulation techniques is to partition a data transmission channel having intersymbol interference (ISI) into a set of orthogonal, memoriless sub-channels, each with its own carrier. Data is transmitted through each sub-channel independently of other sub-channels. Within any sub-channel, the channel response is generally flat as long as the channel is partitioned sufficiently. In DMT modulation, the inverse discrete Fourier transform and discrete Fourier transform may be used to partition these channels and effectively implement DMT modulation and DMT demodulation using computational techniques (rather than using traditional mixers and oscillators). Accordingly, a DMT modulator divides the data transmission channel into a fixed number of N parallel, independent sub-channels in the frequency domain.

Figure 8:
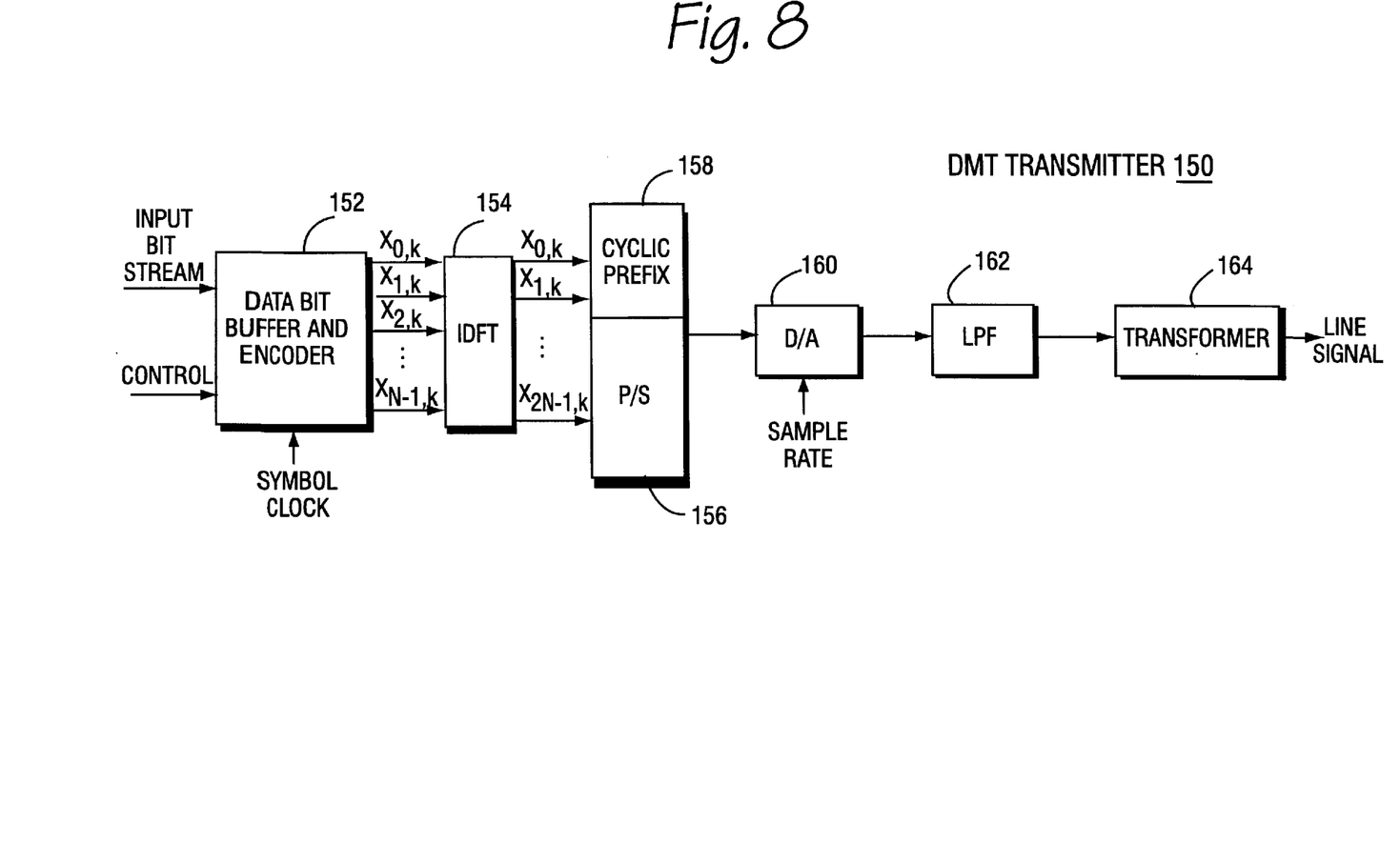
FIG. 8 is a function block diagram of a discrete multi-tone transmitter in which the present invention may be advantageously employed.
Figure 9:
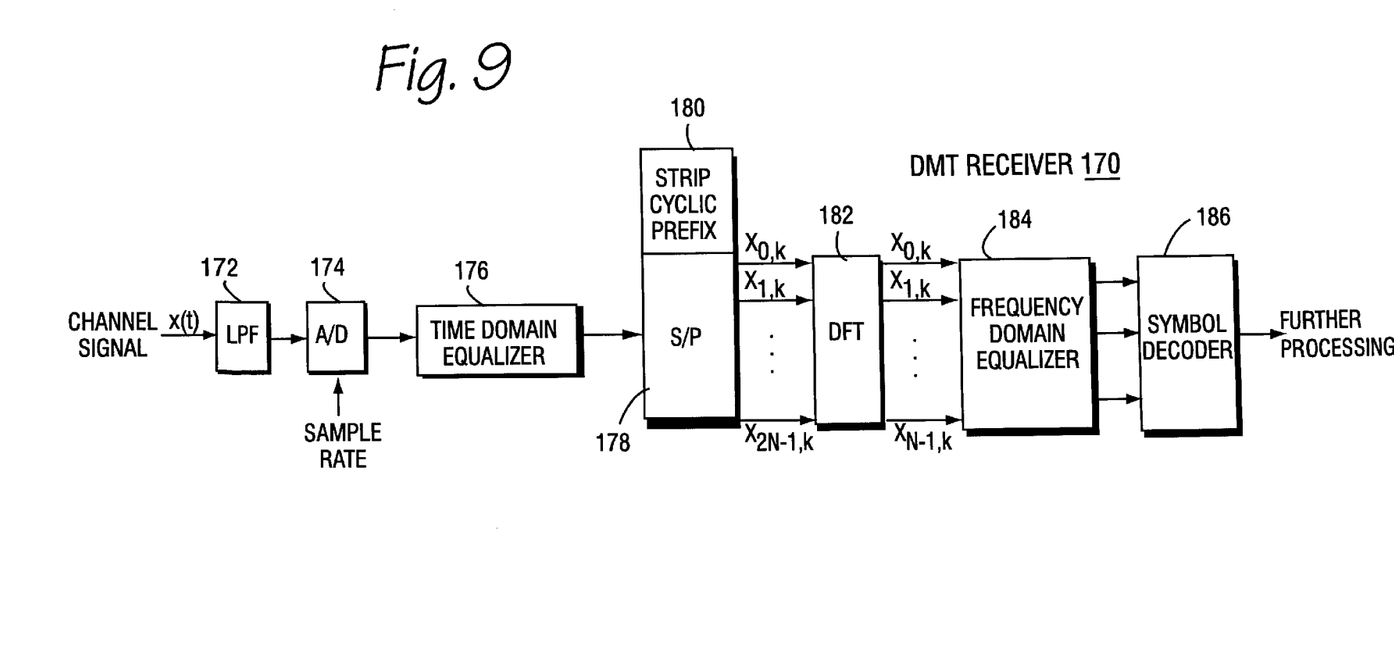
FIG. 9 is a discrete multi-tone receiver which may advantageously employ the present invention.

Referring now to the DMT transmitter 150 shown in FIG. 8, serial input data along with control information are buffered, encoded, and converted into N groups of symbols or points $X_{0,k}$, $X_{1,k}$, $X_{2,k}$ ..., $X_{N-1,k}$. The IDFT block 154 implemented using an N-point FFT as described above modulates N separate carriers with the N-point sequence. The output from the IDFT block 154 is converted back to serial format with an appropriate cyclic prefix in block 158 before being converted to serial format in block 156 and passed through digital-to-analog converter 160. Cyclic prefixing is a discrete time technique use to eliminate interblock interference as known by those skilled in the art. The analog waveform is lowpass filtered (LPF) in block 162 and sent through a DC isolating transformer 164 to produce an analog transmit line signal.

In the DMT receiver 170 shown in FIG. 8, the channel signal x(t) is lowpass filtered in block 172 and converted back to digital form by analog-to-digital converter 174. The digital signal is equalized in an optional time domain equalizer 176, and the cyclic prefix is stripped in block 180. The parallel information $X_{0,k}$, $X_{1,k}$, ..., $X_{2n-1}$, is transformed in DFT block 182 to generate the corresponding spectrum $X_{0,k}$, $X_{1,k}$, ..., $X_{N-1,k}$ which is then equalized in frequency domain equalizer 184 and assembled in decoder 186.

Accordingly, the present invention may be advantageously employed to very efficiently compute DMT modulation/demodulation vectors using a single, N-point FFT to implement both the IDFT and DFT operations as explained above. Rather than implementing a DMT modem with N complex sub-channels in the frequency domain using a 2N-point FFT, the present invention uses a single, N-point FFT thereby dramatically reducing monetary, computational, and power costs.

The invention has been describe in terms of specific examples and embodiment to facilitate understanding. The above embodiments, however, are illustrative rather than limitive. It will be readily apparent to one of ordinary skill in the art that departures may be made from the specific embodiments shown above without departing from the essential spirit and scope of the invention. Thus, while the invention has been described in one example embodiment as being particularly advantageous in a DMT modem, the present invention has wide applicability to other communications and signal processing applications. Therefore, the invention should not be regarded as being limited to the above examples, but should be regarded instead as being fully commensurate in scope with the following claims.

What is claim:

1. A communications device comprising:
a transmitter for transmitting signals;
a receiver for receiving signals;
a block of data manipulation circuitry employed by both the transmitter and receiver; and
a processor employed by both the transmitter and the receiver to efficiently perform an N-point, fast Fourier transform (FFT), where N is a positive integer, the processor performing an FFT operation to translate a 2N-point real input sequence of signals received by the receiver in the time domain to an N-point sequence in the frequency domain, the N-point sequence then being provided to the block of data manipulation circuitry which performs predetermined data manipulation on the N-point sequence, the processor also performing the same FFT operation to translate an N-point sequence to be transmitted by the transmitter from the frequency domain to a 2N-point sequence in the time domain, wherein the N-point sequence to be transmitted is provided to the block of data manipulation circuitry which performs the same predetermined data manipulation before the FFT operation is performed by the processor.

2. The communications device in claim 1, wherein the first operation is a discrete Fourier transform and the second operation is an inverse discrete Fourier transform.

3. The communications device in claim 1, further comprising:
a first conjugater for complex conjugating signals to be transmitted before the N-point FFT.

4. The communications device in claim 1, wherein information signals to be transmitted are modulated onto multiple, discrete multi-tone (DMT) carriers, the modulation being accomplished by the N-point FFT.

5. The communications device in claim 4, wherein the receiver demodulates received DMT signals modulated onto the multiple carriers using the N-point FFT.

6. The communications device in claim 1, wherein received real data sequences are received at a first rate and complex-valued data sequences are generated at a second rate less than the first rate.

7. The communications device in claim 6, wherein the second rate is half the first rate.

8. The communications device in claim 1, wherein complex-valued data sequences to be transmitted are provided at a first rate from the N-point FFT and real-valued data sequences at a second higher rate are generated.

9. The communications device in claim 8, wherein the second rate is twice the first rate.

10. The communications device in claim 3, wherein the conjugated signals are processed to generate an N-point complex sequence to be transmitted corresponding to X(k), where $$X(k) = X_1(k) + W_{2N}^k X_2(k), \text{ with } k = 0, 1, \ldots, N-1,$$

$$X_1(k) = \frac{1}{2}[X_c(k) + X_c^*(N-k)], X_2(k) = \frac{-j}{2}[X_c(k) - X_c^*(N-k)],$$

and $$W_{2N}^k = e^{-j2\pi k/2N}.$$

11. The communications device in claim 10, further including:
a second conjugater for complex conjugating X(k).

12. The communications device in claim 1, wherein the signals to be transmitted are prepared before processing by the N-point FFT using circuitry including:
a last-in-first-out (LIFO) buffer receiving a complex signal sequence;
a conjugater complex-conjugating complex signals output from the LIFO buffer;
a summer summing the complex-conjugated output with the input complex sequence;
a differencer differencing the complex-conjugated output with the input complex sequence;
a multiplier multiplying a differencer output by one or more factors; and
a combiner combining the summer and multiplier outputs.

13. The communications device in claim 1, wherein received signals are processed after the N-point FFT using circuitry including:
a last-in-first-out (LIFO) buffer receiving a complex signal sequence;
a conjugater complex-conjugating complex signals output from the LIFO buffer;
a summer summing the complex-conjugated output with the input complex sequence;
a differencer differencing the complex-conjugated output with the input complex sequence;
a multiplier multiplying a differencer output by one or more factors; and
a combiner combining the summer and multiplier outputs.

14. A communications device comprising:
a transceiver for processing and transmitting signals along a transmit data processing path and for receiving and processing received signals along a receive data processing path;
transform circuitry selectively connected to the transmit and receive data processing paths for performing substantially the same discrete Fourier transform operation on data present on the transmit and receive data processing paths; and
a controller detecting when the communications device is transmitting and when the communications device is receiving, and in response to such detecting, selectively routing data from the transmit and receive data processing paths to the transform circuitry.

15. The communications device in claim 14, the receive data processing path further comprising:
a data compressor compressing a 2N-point real data sequence into an N-point complex data sequence prior to routing to the transform circuitry.

16. The communications device in claim 14, wherein the transform circuitry performs an N-point Fourier transform, the receive data processing path further comprising:
preparation circuitry preparing an N-point sequence for input to the N-point, Fourier transform.

17. The communications device in claim 16, the receive data processing path employing the preparation circuitry to ensure that the N-point sequence is Hermite symmetric.

18. The communications device in claim 17, wherein the preparation circuitry includes:
a last-in-first-out (LIFO) buffer receiving a complex signal sequence;
a means for complex-conjugating complex signals output from the LIFO buffer;
a summer summing the complex-conjugated output with the input complex sequence;

a differencer differencing the complex-conjugated output with the input complex sequence;

a multiplier multiplying a differencer output by one or more factors; and a combiner combining the summer and multiplier outputs.

19. The communications device in claim 14, the transmit data processing path further comprising:

a first conjugating means for generating a complex conjugate of data to be processed on the transmit data processing path before processing by the transform circuitry, and a second conjugating means for generating on the transmit data processing path a complex conjugate of data received from the transform circuitry.

20. The communications device in claim 19, the transmit data processing path further comprising:

a data expander for expanding an N-point complex data sequence output by the second conjugating means into a 2N-point real data sequence.

21. The communications device in claim 14, wherein the communications device is a multi-carrier modulator and demodulator using the discrete Fourier transform to modulate and demodulate multiple carriers.

22. A data processing device comprising:

a first data processing path;

a second data processing path;

transform circuitry selectively connected to the first and second data processing paths selectively performing both a discrete Fourier transform operation on a 2N-point sequence on the first data processing path and an inverse discrete Fourier transform on an N-point sequence on the second data processing path using substantially the same N-point fast Fourier transform.

23. The data processing device in claim 22, the first data processing path including:

a data compressor compressing real data into complex data prior to routing to the transform circuitry, and the second data processing path further comprising:

a data expander expanding complex data generated by the N-point fast Fourier transform into real data.

24. The data processing device in claim 23, the first data processing path further comprising:

extraction circuitry for processing data input to the fast Fourier transform.

25. The data processing device in claim 23, the second data processing path further comprising:

preparation circuitry for processing data input to the fast Fourier transform.

26. The data processing device in claim 23, the second data processing path further comprising:

first means for performing a complex conjugate of data to be processed on the second data processing path before processing by the preparation circuitry, and second means for generating a complex conjugate of data received from the fast Fourier transform.

27. The data processing device in claim 26, the second data processing path further comprising:

a data expander for converting an N-point complex data sequence output by the second means into a 2N-point real data sequence.

28. A communications method, comprising the steps of:

providing a 2N-point, Hermite symmetric sequence to be transmitted to a receiver;

generating from the 2N-point Hermite symmetric sequence, a complex, N-point sequence $X(k)$ which is one-half of the 2N-point Hermite symmetric sequence to be transmitted, where N is an integer;

forming sequences $X_1(k)$ and $X_2(k)$ as follows:
$X_1(k)=\frac{1}{2}\{X^*(k)+X(N-k)\}$ and
$X_2(k)=-j/2\{X^*(k)-X(N-k)\}$;

computing a result $X_r(k)=X_1(k)+W_{2N}^k X_x(k)$, where $W_{2N}^k=e^{-j2k/2N}$;

performing a discrete Fourier transform on the sequence $X_r(k)$ to modulate N information carriers;

transmitting the modulated N information carriers over a communications channel.

29. The method in claim 28, wherein the performing step produces an N-point, complex sequence $x_r(n)=x_1(n)+jx_2(n)$ in the time domain, the method further comprising:

obtaining a 2N-point sequence from $x_r(n)$.

30. The method in claim 28, wherein the obtaining step includes expanding $x_r(n)$ so that $x(2n)=x_1(n)$, and $x(2n+1)=-x_2(n)$.

31. The method in claim 28, further comprising:

receiving a 2N-point transmitted sequence;

translating the received, 2N-point sequence into an N-point complex sequence; and performing the discrete Fourier transform on the N-point complex sequence to extract the originally transmitted, N-point, complex sequence $X(k)$.

32. The method in claim 28, wherein before the providing step, the N-point sequence $X(k)$ is complex-conjugated.

33. The method in claim 32, wherein after the performing step, the method further includes complex-conjugating output signals from the discrete Fourier transform.

34. A method for transceiving signals where the same N-point Fourier transform processor or algorithm, being a positive integer is used to perform an inverse discrete Fourier transform of a sequence to be transmitted having greater than N-points and to perform a discrete Fourier transform of received signals having greater than N-points, wherein the same set of data manipulation operations is performed on the sequence before the inverse discrete Fourier transform is performed by the same N-point Fourier transform processor or algorithm and as is performed on the sequence after the discrete Fourier transform is performed.

35. The method in claim 34, wherein the greater than N-points corresponds to 2N-points.

36. The method in claim 34, wherein the inverse discrete Fourier transform is implemented by complex conjugating a complex sequence to be transmitted, then performing the discrete Fourier transform on the complex conjugated sequence, followed by complex conjugating the transformed sequence.

37. The method in claim 34, wherein the sequence to be transmitted is converted from a real sequence into a complex sequence.

38. The method in claim 36, wherein the complex-conjugated transformed sequence is converted into a real sequence.

39. The method in claim 34, wherein the data manipulations operations include:

receiving a complex signal sequence in a last-in-first-out (LIFO) buffer;

complex conjugating-complex signals output from the LIFO buffer;

summing the complex-conjugated output with the input complex sequence;

differencing the complex-conjugated output with the input complex sequence;

multiplying a differencer output by one or more factors; and combining the summer and multiplier outputs.

* * * * *